(12) United States Patent  
Puigardeu Aramendia et al.

(10) Patent No.: US 9,407,789 B2  
(45) Date of Patent: Aug. 2, 2016

(54) METHODS AND SYSTEMS TO COMPRESS AN IMAGE IN A PRINTING PROCESS

(75) Inventors: Sergio Puigardeu Aramendia, Barcelona (ES); Jorge Martinez De Salinas Vazquez, Sunnyvale, CA (US); Joan Vidal Fortia, Barcelona (ES); Lluis Abello Rosello, Tarragona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/414,596

(22) PCT Filed: Jul. 27, 2012

(86) PCT No.: PCT/EP2012/003213  
§ 371 (c)(1),  
(2), (4) Date: Jan. 13, 2015

(87) PCT Pub. No.: WO2014/015887  
PCT Pub. Date: Jan. 30, 2014

(65) Prior Publication Data  
US 2015/0195423 A1 Jul. 9, 2015

(51) Int. Cl.  
*H04N 1/41* (2006.01)  
*G06K 15/10* (2006.01)  
*G06K 15/02* (2006.01)

(52) U.S. Cl.  
CPC ............... *H04N 1/41* (2013.01); *G06K 15/10* (2013.01); *G06K 15/1801* (2013.01); *G06K 15/1865* (2013.01); *G06K 15/1894* (2013.01)

(58) Field of Classification Search  
None  
See application file for complete search history.

(56) References Cited

U.S. PATENT DOCUMENTS

| 4,949,190 A | 8/1990 | Thompson |
| 5,675,719 A | 10/1997 | Matias et al. |

(Continued)

FOREIGN PATENT DOCUMENTS

| EP | 0886236 | 12/1998 |
| EP | 0950980 | 10/1999 |

(Continued)

OTHER PUBLICATIONS

Queiroz at al.; Mixed Raster Content (MRC) Model for Compound Image Compression; Corporate Research & Technology, Xerox Corp.; 1999; vol. 3653; pp. 1106-1117; http://citeseerx.ist.psu.edu/viewdoc/summary?doi=10.1.1.135.8398.

*Primary Examiner* — Thomas D Lee  
(74) *Attorney, Agent, or Firm* — HP Inc. Patent Department

(57) ABSTRACT

A method to selectively compress an image in a printing process comprises the steps of providing a first representation of an image to be printed on a printer to a printing pipeline, processing the first representation in the printing pipeline to derive a second representation of the image, wherein the second representation comprises physical printing parameters adapted to the image and the printer, and compressing the second representation to obtain a compressed third representation of the image. The third representation of the image is again supplied to the printing pipeline, and is processed in the printing pipeline to derive a fourth representation of the image. The fourth representation of the image is provided to a printhead of the printer for printing. The invention also relates to a corresponding system to selectively compress an image in a printing process, as well as to a computer-readable medium comprising computer-readable instructions to cause a computer coupled to or integrated into a system to selectively compress an image in the printing process to perform a method with the steps described above.

14 Claims, 2 Drawing Sheets

(56) References Cited

U.S. PATENT DOCUMENTS

| | | | |
|---|---|---|---|
| 5,731,823 A | 3/1998 | Miller et al. | |
| 5,742,305 A | 4/1998 | Hackleman | |
| 6,433,885 B1 | 8/2002 | Verghese et al. | |
| 6,583,887 B1 * | 6/2003 | Clouthier et al. | 358/1.15 |
| 7,173,739 B2 | 2/2007 | Silverbrook et al. | |
| 7,443,543 B2 | 10/2008 | Kaburagi | |
| 2004/0061895 A1 * | 4/2004 | Sugimoto | 358/1.15 |
| 2004/0114195 A1 | 6/2004 | Ebner et al. | |
| 2009/0059247 A1 | 3/2009 | Kawasaki | |
| 2009/0060357 A1 | 3/2009 | Horikoshi | |

FOREIGN PATENT DOCUMENTS

| | | |
|---|---|---|
| EP | 1178669 | 2/2002 |
| EP | 1574941 | 9/2005 |

* cited by examiner

METHODS AND SYSTEMS TO COMPRESS AN IMAGE IN A PRINTING PROCESS

BACKGROUND

Modern printers employ printheads with an increasingly large number of printing nozzles, in particular for wide-format printing. The image to be printed is usually processed in a printing pipeline, where a masking, changes to the image depending on the printer status, and pixel-to-drop translation may take place, and is then sent to the printhead at printing resolution via a printing data channel. The image at printing resolution may be rather large, and information needs to be sent to each nozzle of the printhead repeatedly and at high frequency. As the number of nozzles increases, the required bandwidth of the printing data channel needs to increase correspondingly. For instance, assume a 36 inches page-wide array printer that prints at 10 ips at 1200×1200 dpi. Information hence needs to be sent to 36 inch×1200 dpi×4 colors=172,800 nozzles at 10 ips×1200 dpi=12,000 times per second, resulting in a data transmission rate of more than 2 Gbits per second. The high data transmission rates require large channel bandwidths and sophisticated electronics to control the data handling, resulting in an increase in complexity and cost of the entire printing system.

What is needed is a printing system that allows to enhance the printing throughput without requiring corresponding enhancements in the channel bandwidth and electronics.

DETAILED DESCRIPTION OF PREFERRED EMBODIMENTS OF THE INVENTION

Figure 1:
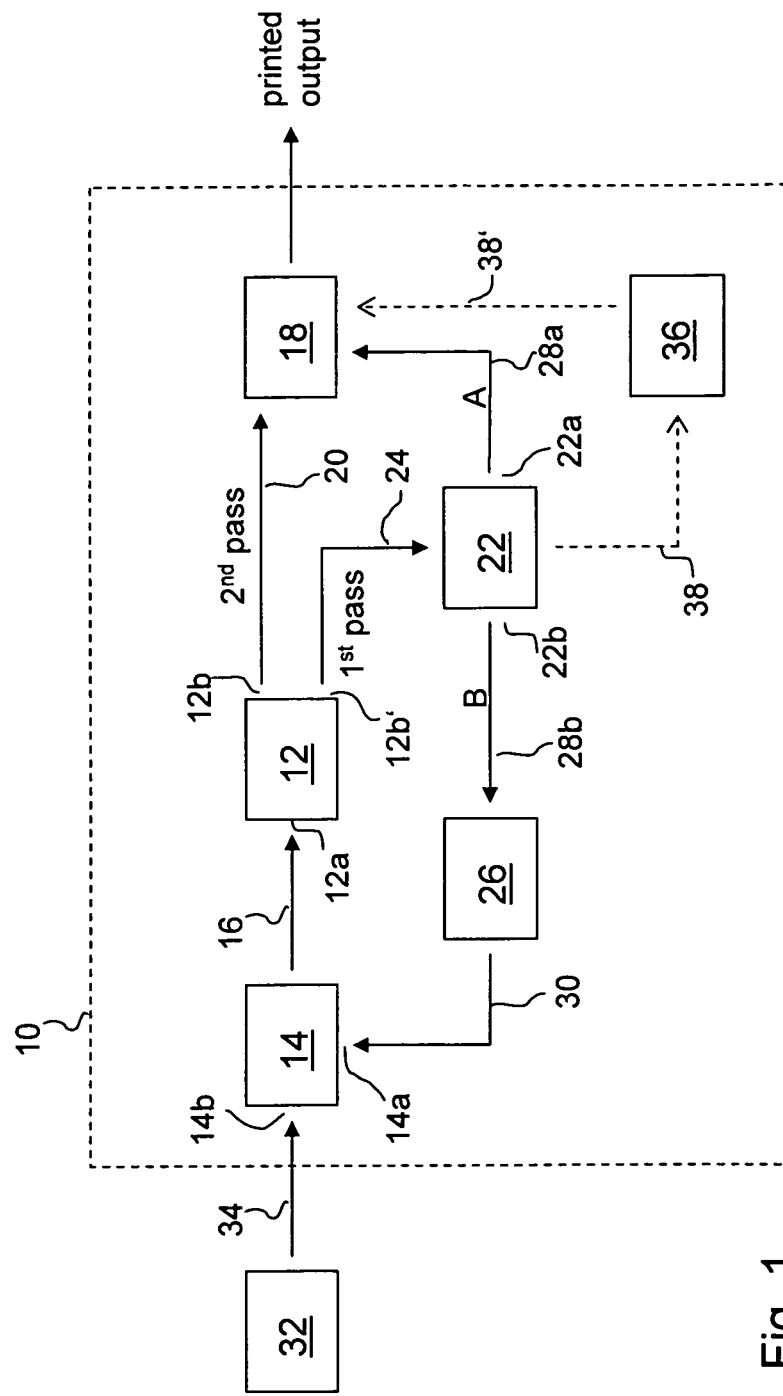
FIG. 1 is a schematic drawing showing the components of a system to selectively compress an image according to an example of the invention.

In an aspect, the invention relates to a method to compress an image in a printing process, comprising the steps of: providing to a printing pipeline a first representation of an image to be printed on a printer; processing said first representation in said printing pipeline to derive a second representation of said image, said second representation comprising physical printing parameters adapted to said image and said printer; com-pressing said second representation to obtain a compressed third representation of said image; supplying said third representation to said printing pipeline, and processing said third representation in said printing pipeline to derive a fourth representation of said image; and providing said fourth representation to a printhead of said printer.

The inventors found that significant savings in terms of data bandwidth can be obtained by compressing the second representation of the image to obtain a third (compressed) representation of the image, sending said third representation a second time through the printing pipeline to obtain a fourth (compressed) representation, and providing said fourth representation of the image to the printhead via the printing data channel. The invention allows to use fast print modes where significant compression is possible. This usually overcompensates the processing overhead associated with the backflow through the printing pipeline.

The method may further comprise a step of analyzing said second representation to determine whether said second representation is suitable for compression. In a preferred embodiment of the invention, said steps of compressing the second representation to obtain a compressed third representation of said image, supplying said third representation to said printing pipeline, and processing said third representation in said printing pipeline to derive a fourth representation of said image, and providing said fourth representation to said printhead of said printer are selectively performed only if said step of analyzing said second representation yields that said second representation is suitable for compression.

If said step of analyzing said second representation yields that said second representation is not suitable for compression, said second representation may be provided directly to said printhead, without being compressed and re-processed through said printing pipeline.

Compression of data en route from the printing pipeline to the printhead would at first sight not appear a promising solution. Some of the images provided by the printing pipeline cannot be compressed losslessly, and hence a compression would appear to necessarily entail an undesirable decline in the printing quality. But the inventors found that in a typical print job, the vast majority of images provided by the printing pipeline allows a substantial amount of compression, whereas the percentage of images that do not allow substantial compression is typically in the range of below 5%. Those images that may not allow substantial compression without a loss of printing quality may be sent through the printing data channel uncompressed, and may be printed at reduced speeds. Faster print modes can be employed for those images for which substantial compression is feasible. By selectively compressing the image prepared in the printing pipeline and adjusting the data transfer speed and/or printing speed depending on whether substantial compression is possible, the invention allows to make optimal use of the printing resources and to optimize the printing throughput, without sacrificing the image quality.

The invention also relates to a system to compress an image in a printing process, comprising: a printing pipeline with an input and an output, wherein said printing pipeline receives a first representation of an image to be printed at said input and processes said first representation to derive a second representation of said image, and outputs said second representation at said output; an analyzation means coupled to said output of said printing pipeline, said analyzation means to analyze said second representation and to determine whether said second representation is suitable for compression; a compression means coupled to said analyzation means, said compression means to compress said second representation to obtain a compressed third representation of said image; and a backflow channel connecting said compression means to said input of said printing pipeline, said backflow channel to supply said third representation to said printing pipeline.

In another aspect, the invention relates to a computer-readable medium comprising computer-readable instructions to cause a computer coupled to or integrated into a system to compress an image in a printing process to perform a method with the steps of: providing to a printing pipeline a first representation of an image to be printed on a printer; processing said first representation in said printing pipeline to derive a second representation of said image, said second representation comprising physical printing parameters adapted to said image and said printer; compressing said second representation to obtain a compressed third representation of said image; supplying said third representation to said printing pipeline, and processing said third representation in said printing pipeline to derive a fourth representation of said image.

The invention is particularly useful for wide-format printers such as page-wide array printers, but may likewise be employed in any other kind of printing device, such as a scan axis printer.

FIG. 1 is a schematic illustration of a printer 10 in which the present invention may be employed. The printer may be any device used to generate printouts, such as a laser or inkjet printer, a photocopying machine, a bookmaking machine, or a multi-function machine which performs a print outputting function. The printer 10 comprises a printing pipeline 12 whose input 12a is connected to an image storing unit 14 via a data channel 16, and whose first output 12b is connected to the printhead 18 of the printer 12 via a printing data channel 20. A second output 12b' of the printing pipeline 12 is connected to an analyzation unit 22 via a data channel 24. The analyzation unit 22 has a first output 22a connected to the printhead 18, and a second output 22b connected to a compression unit 26 via a data channel 28.

An output of the compression unit 26 is connected to a first input 14a of the image storing unit 14 via a backflow data channel 30. A second input 14b of the image storing unit 14 may be connected to an image pipeline 32 via an input data channel 34.

FIG. 1 is a conceptional and schematic drawing intended to assist in understanding the present invention, and hence the positions of the components within the printer 10 may be chosen differently from the configuration of FIG. 1. Some or all of these components may also be combined into a single unit, depending on the system requirements. For instance, the image storing unit 14 may be integrated into the printing pipeline 12, or the compression unit 26 may be integrated into the analyzation unit 22.

As can be taken from FIG. 1, the printing pipeline 12, storing unit 14, printhead 18, analyzation unit 22, and compression unit 26 may all be located internally within the printer 10. In an alternative configuration, some of these components may be located externally to the printer 10.

In the configuration shown in FIG. 1, the image pipeline 32 is located externally to the printer 10 and may for instance be provided as part of an external computer system (not shown) connected to the printer 10 via the input data channel 34. In particular, the image pipeline 32 may form part of the printer driver running on said computer system. However, in an alternative configuration, the image pipeline 32 may likewise be included or integrated within the printer 10.

Figure 2:
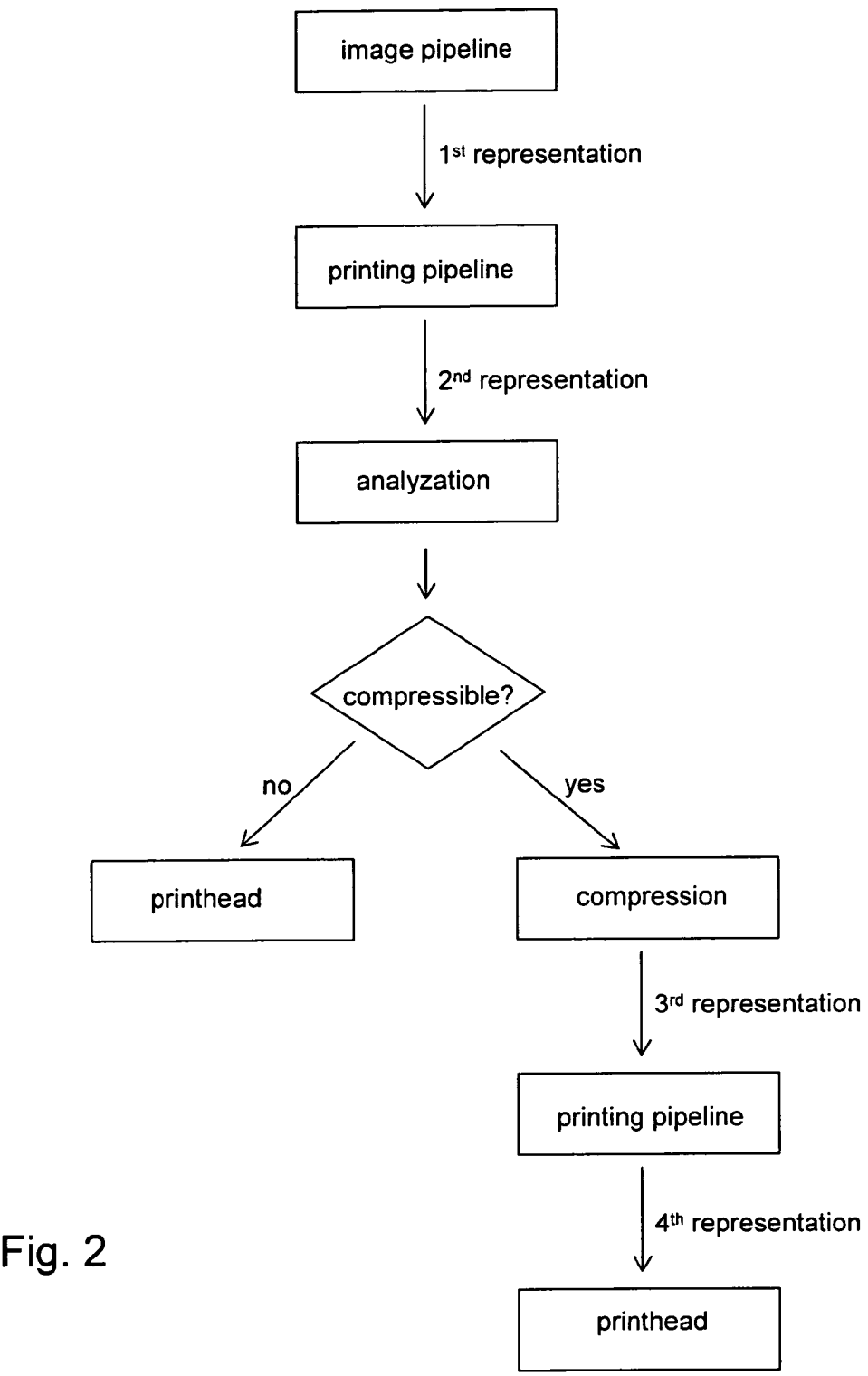
FIG. 2 is a flow diagram illustrating a method to selectively compress an image in a printing process according to an example of the invention.

Operation of the selective image compression in accordance with an example of the invention will now be described with reference to FIG. 1 and the flow diagram of FIG. 2.

An application running on a computer system (not shown) may generate an image file to be printed on the printer 10 connected to the computer system. The image file may be in any format, and may comprise drawings, pictures or photographs, or text, or any combination thereof. The printer driver running on the computer system comprises an image pipeline 32 that applies image manipulation such as clipping, scaling, color management or half-toning to the image file to provide a first representation of the image. The first representation may be a representation comprising one or two bits of information per pixel.

The first representation of the image is sent from the computer system (not shown) to the storing unit 14 of the printer 10 via the input data channel 34. The storing unit 14 temporarily stores and sequences the image files provided to the printer 10, and forwards them one-by-one via the data channel 16 to the printing pipeline 12 for further processing. The printing pipeline 12 converts the first representation of the image into a second representation that comprises the physical printing parameters adapted to the printer 10 and printhead 18. Operations performed by the printing pipeline 12 may comprise changes to the image depending on the status of the printer 10 or printhead 18, a masking of the image, as well as a pixel-to-drop translation. The pixel-to-drop translation provides the image at printing resolution in a format that contains information for controlling and selectively triggering the nozzles of the printhead 18. The second representation may comprise one bit of information per pixel per color, which may comprise an instruction for the printhead 18 whether the printhead 18 shall fire a drop of ink for that pixel or not.

The second representation of the image would be ready for printing, but is not yet sent to the printhead 18. Rather, the second representation is passed on via the output 12b' and the data channel 24 to the analyzation unit 22. The analyzation unit 22 analyzes the second representation of the image to determine whether a lossless compression of the second representation is feasible. The analyzation unit 22 may perform any kind of data analysis, such as an analysis of repetitions and redundancies in the second representation of the image. For instance, in a CAD file typically up to 95% of the image is completely empty, and the analyzation unit 22 may identify those parts of the second representation corresponding to the image portion where no print is applied.

The analyzation unit 22 may be programmed to perform a selection depending on the result of the analysis of the second representation: (A) if no substantial compression is feasible, the second representation is sent to the printhead 18 unamended via the first output 22a and the data channel 28a. The printhead 18 then provides a printing output of the image. (B) If, on the other hand, the analyzation unit 22 determines that a substantial lossless compression is feasible, the second representation of the image is forwarded via the second output 22b of the analyzation unit 22 and the data channel 28b to the compression unit 26 for compression of the second representation.

The analyzation unit 22 may select the channel (A) or (B) depending on the compression rate that it determines can be achieved for the second representation, and may send the second representation to the printhead 18 if the expected compression rate is below a pre-defined threshold (such as 110%) and may send the second representation to the compression unit 26 if the compression rate is equal to or above the predefined threshold. The compression rate may be defined as the ratio of a data size of said image before compression to an expected or estimated data size of said image after compression The compression unit 26 may employ any lossless compression algorithm to provide a compressed third representation of the image to be printed. Suitable compression algorithms that may be employed comprise Huffman codes, or arithmetic coding as described on the webpage http://xlinux.nist.gov/dads//HTML/arithmeticCoding.html and the references cited there.

In an example of the invention, the analyzation unit 22 and the compression unit 26 may be combined into a single unit. The analyzation performed to determine whether the second representation is suitable for compression may then comprise the steps of copying the second representation, and applying the compression algorithm to this copy to try to compress the image. The compression rate may again be defined as the ratio of a data size of said image before compression to a data size of said image after compression. If the compression ratio is below a pre-determined threshold (such as 110%), the compression is discarded, and the original copy of the second representation of the image file is sent to the printhead 18 via the first output 22a and the data channel 28a (variant A). In this case, the image representation sent to the printhead 18 will be large, and a low printing speed will be selected. If, on the other hand, the compression ratio is equal to or above the predetermined threshold value, the original copy of the second representation is discarded, and the compressed third representation of the image is sent back to the first input 14a of the image storing unit 14 via the backflow channel 30 (variant B).

The compressibility of the second representation may also be tested by compressing only a selected portion of said second representation.

From the image storing unit 14, the compressed third representation of the image will again be sent to the printing pipeline 12 via the data channel 16 for changes to the image depending on the printer status, for masking of the image and for pixel-to-drop translation. In some cases, the printing parameters such as the printing resolution may be amended in the second pass through the printing pipeline 12, and the number of print copies may likewise be adjusted.

The second processing in the printing pipeline 12 provides a fourth representation of the image, which will not be passed on to the analyzation unit 22 a second time, but will rather be forwarded straight to the printhead 18 via the output 12b of the printing pipeline 12 and the printing data channel 20. Since the fourth representation of the image is a compressed representation, the required bandwidth of the printing data channel 20 can be chosen lower than the bandwidth of the data channel 28a. Alternatively, a higher printing speed may be attained with the same bandwidth. At the printhead 18, the fourth representation of the image may be uncompressed before printing. The image printed by the printhead 18 is then output.

By adjusting the bandwidth of the data channels 20, 28a and/or the print speed of the printer 10 depending on the analysis of the second representation, the invention allows to make optimal use of the printing resources and/or to maximize the printing speed without sacrificing the printing quality.

The results of the analysis of the second representation at the analyzation unit 22 may additionally be forwarded to printer adjusting means 36 via a data channel 38. These may also include results from an analysis of the ink density from the second representation. The printer adjusting means 36 may adjust the settings of the printhead 18 and further subsystems of the printer 10 depending on the analyzation results and the image size. The subsystems may form part of the printhead 18 and may be coupled to the printer adjusting means 36 via a data channel 38'. They may include the ink delivery system (not shown) of the printhead and/or the dryer unit (not shown) of the printer 10. Forwarding this data via the channels 38, 38' allows the printer 10 to choose the amount of ink delivered to the printhead 18 and/or the drying time and/or the drying temperature depending on whether a compressed image or an uncompressed image is provided to the printhead 18.

The invention is particularly advantageous in a multi-copy workflow, in which one and the same image is provided to the printhead 18 multiple times. In this scenario, the analysis of the second representation of the image and the compression only need to be performed once, and multiple copies of the compressed and processed fourth representation may then be sent to the printhead 18 via the printing data channel 20. If n denotes the numbers of copies to be printed, the printing then only requires n+1 rather than 2·n passes through the printing pipeline 12, a substantial saving for large n. Hence, in a multi-copy workflow with a large number n of copies, the overhead resulting from the two-pass backend workflow can be minimized.

The invention allows to increase the maximum throughput and the average productivity of the printer without requiring more sophisticated control or channels of higher bandwidth. Alternatively, conventional throughput can be achieved with minimal resources and at reduced cost, since the compression according to the invention allows to transfer the data files to the printhead via channels of lower bandwidth. The invention also reduces the extra costs of printer subsystems that have conventionally been overdesigned for most of the images that are typically printed.

REFERENCE SIGNS 10 printer
12 printing pipeline
12a input of printing pipeline 12
12b, 12b' outputs of printing pipeline 12
14 image storing unit
14a first input of image storing unit 14
14b second input of image storing unit 14
16 data channel
18 printhead
20 printing data channel
22 analyzation unit
22a first output of analyzation unit 22
22b second output of analyzation unit 22
24 data channel
26 compression unit
28a, 28b data channels
30 backflow data channel
32 image pipeline
34 input data channel
36 printer adjusting means
38, 38' data channels

The invention claimed is:

1. A method to compress an image in a printing process, comprising the steps of:
   providing a first representation of an image to be printed on a printer to a printing pipeline;
   processing said first representation in said printing pipeline to derive a second representation of said image, said second representation comprising physical printing parameters adapted to said image and said printer;
   compressing said second representation to obtain a compressed third representation of said image;
   supplying said third representation to said printing pipeline via a backflow channel, and processing said third representation in said printing pipeline to derive a fourth representation of said image; and
   providing said fourth representation to a printhead of said printer.

2. The method according to claim 1, further comprising a step of analyzing said second representation to determine whether said second representation is suitable for compression.

3. The method according to claim 2, wherein said step of analyzing said second representation comprises a step of compressing at least a portion of said second representation by means of a pre-determined compression algorithm, and comparing a data size of said portion after compression to a data size of said portion be-fore compression.

4. The method according to claim 3, wherein said second representation is determined suitable for compression if a ratio of said data size before compression to said data size after compression is above a pre-determined threshold value.

5. The method according to claim 2, wherein said steps of compressing said second representation and supplying said third representation to said printing pipeline and processing said third representation and providing said fourth representation to said printhead are performed only in case said step of analyzing yields that said second representation is suitable for compression.

6. The method according to claim 5, wherein, in case said step of analyzing yields that said second representation is not suitable for compression, said second representation is provided to said printhead uncompressed.

7. The method according to claim 2, further comprising a step of adjusting settings of said printer depending on said analyzing said second representation.

8. The method according to claim 7, wherein said settings comprise a print speed of said printer and/or an ink delivery of said printer and/or a drying time of said printer and/or a drying temperature of said printer.

9. The method according to claim 1, wherein said compression is a lossless compression.

10. The method according to claim 1, wherein said step of processing said first representation in said printing pipeline comprises the steps of masking said image and/or modifying said image depending on a status of said printer and/or performing a pixel-to-drop translation of said image.

11. The method according to claim 1, wherein said printing pipeline is located in said printer.

12. The method according to claim 1, wherein said first representation is provided to said printer from an image pipeline, said image pipeline comprising processing steps of color management of said image and/or half-toning of said image.

13. The method according to claim 1, wherein said fourth representation is provided to said printhead multiple times.

14. A non-transitory computer-readable medium comprising computer-readable instructions to cause a computer coupled to or integrated into a system to compress an image in a printing process to perform a method with the steps of:
providing a first representation of an image to be printed on a printer to a printing pipeline;
processing said first representation in said printing pipeline to derive a second representation of said image, said second representation comprising physical printing parameters adapted to said image and said printer;
compressing said second representation to obtain a compressed third representation of said image; and
supplying said third representation to said printing pipeline via a backflow channel, and processing said third representation in said printing pipeline to derive a fourth representation of said image.

* * * * *